United States Patent
Roger et al.

(10) Patent No.: US 10,563,028 B2
(45) Date of Patent: Feb. 18, 2020

(54) FILMS AND MEMBRANES OF POLY(ARYL KETONES) AND METHODS OF CASTING THE SAME FROM SOLUTION

(71) Applicant: Arkema Inc., King of Prussia, PA (US)

(72) Inventors: Christophe Roger, Ithaca, NY (US); Manuel A. Garcia-Leiner, Baltimore, MD (US); Jean-Alex Laffitte, Biarritz (FR); Julie Boyer, Pau (FR); Stephan Moyses, Deimer, NY (US); Lawrence H. Judovits, Collegeville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 16/116,982

(22) Filed: Aug. 30, 2018

(65) Prior Publication Data

US 2018/0371192 A1     Dec. 27, 2018

Related U.S. Application Data

(63) Continuation of application No. 14/122,306, filed as application No. PCT/US2012/037893 on May 15, 2012, now Pat. No. 10,087,295.

(60) Provisional application No. 61/490,844, filed on May 27, 2011.

(51) Int. Cl.
| | | |
|---|---|---|
| C08J 5/18 | (2006.01) | |
| C08G 65/46 | (2006.01) | |
| B29C 39/00 | (2006.01) | |
| C08G 65/00 | (2006.01) | |
| C08L 71/00 | (2006.01) | |

(52) U.S. Cl.
CPC ............. *C08J 5/18* (2013.01); *B29C 39/003* (2013.01); *C08G 65/00* (2013.01); *C08G 65/46* (2013.01); *C08L 71/00* (2013.01)

(58) Field of Classification Search
CPC .......... C08J 5/18; B29C 39/003; C08G 65/00; C08G 65/46; C08L 71/00
See application file for complete search history.

(56) References Cited

U.S. PATENT DOCUMENTS

| | | |
|---|---|---|
| 4,320,224 A | 3/1982 | Rose et al. |
| 4,957,817 A | 9/1990 | Chau et al. |
| 5,356,958 A | 10/1994 | Matthews |
| 6,783,711 B2 | 8/2004 | Kurth et al. |
| 7,202,327 B2 | 4/2007 | Haring et al. |
| 7,407,609 B2 | 8/2008 | Brown |
| 7,428,029 B2 | 9/2008 | Murakami et al. |
| 7,648,652 B2 | 1/2010 | Lee et al. |
| 7,850,873 B2 | 12/2010 | Lee et al. |
| 8,030,414 B2 | 10/2011 | Haring et al. |
| 8,088,447 B2 | 1/2012 | Chang et al. |
| 8,199,289 B2 | 6/2012 | Murakami et al. |
| 2004/0237786 A1 | 12/2004 | Brown |
| 2005/0186378 A1 | 8/2005 | Bhatt |
| 2007/0060688 A1 | 3/2007 | Wang et al. |
| 2008/0044683 A1* | 2/2008 | Chan .................. C08G 73/1007 428/626 |
| 2010/0082072 A1 | 4/2010 | Sybert et al. |
| 2010/0267883 A1 | 10/2010 | Bhatt |
| 2010/0305277 A1 | 12/2010 | Dawkins et al. |
| 2011/0311811 A1 | 12/2011 | Collette et al. |
| 2012/0263953 A1 | 10/2012 | Towle |

FOREIGN PATENT DOCUMENTS

| | | | |
|---|---|---|---|
| EP | 0 382 356 B1 | 8/1990 | |
| EP | 0 499 381 A1 | 8/1992 | |
| JP | 2003-056129 A2 | 2/2003 | |
| JP | 2005133047 A | 5/2005 | |
| JP | 2005-192550 A2 | 7/2005 | |
| JP | 2006-308646 A2 | 11/2006 | |
| JP | 2006-173111 | 12/2007 | |
| JP | 2010-155968 A2 | 7/2010 | |
| WO | WO 2003/000390 A2 | 1/2003 | |
| WO | WO2007/012388 * | 2/2007 | ............. B01D 71/02 |
| WO | WO 2010/091136 A1 | 8/2010 | |
| WO | WO 2011/004164 A2 | 1/2011 | |

OTHER PUBLICATIONS

Cheng, Stephen Z. D., Ho, Rong-Ming, Hsiao, Benjamin S. and Gardner, Kenncorwin H., "Polymorphism and Crystal Structure Identification in Poly(Aryl Ether Ketone Ketone)s," Macromol Chem. Phys. 197 pp. 185-213 (1996).
Odian, G., Wiley, John and Sons—"Principles of Polymerization" pp. 156-157.

* cited by examiner

*Primary Examiner* — Robert S Walters, Jr.
(74) *Attorney, Agent, or Firm* — Lynn B. Morreale

(57) ABSTRACT

A method of manufacturing a film or membrane includes: (a) dissolving at least one polymer comprising a poly(aryl ketone) in at least one solvent to form a dope; (b) depositing the dope on a substrate to form a coated substrate at appropriate conditions; and (c) drying the coated substrate to form the film or membrane. The dope may also include additional polymers or fillers, such as carbon nanotubes.

10 Claims, No Drawings

FILMS AND MEMBRANES OF POLY(ARYL KETONES) AND METHODS OF CASTING THE SAME FROM SOLUTION

CROSS-REFERENCE TO RELATED APPLICATIONS

This application is a continuation application of U.S. Ser. No. 14/122,306, filed Nov. 26, 2013 which is a national stage application under 35 U.S.C. § 371 of PCT/US2012/037893, filed May 15, 2012, which claims benefit to U.S. patent application Ser. No. 61/490,844, filed May 27, 2011.

FIELD OF THE INVENTION

The invention relates to films and membranes of poly(aryl ketones), such as poly(etherketoneketone) (PEKK), and methods of making the films and membranes by using a solvent cast process.

BACKGROUND OF THE INVENTION

Thermoplastic polymers, such as poly(aryl ketones), have a wide variety of uses in a number of engineering applications. Many thermoplastic polymers are well known engineering polymers, which can be made from a variety of starting materials. Poly(aryl ketones) have had the disadvantage, however, of being difficult to work with, for example, to form into a film or membrane. In particular, many poly(aryl ketones) do not dissolve readily in most solvents. Therefore, polymer solutions (or dopes) could not be formed or used as desired. Thus, films and membranes including poly(aryl ketones) could not be readily cast from solution.

SUMMARY OF THE INVENTION

The present invention provides for films, membranes, and fibers of poly(aryl ketones), such as poly(etherketoneketone) (PEKK), and associated methods of making the same by using a solvent cast process. In particular, at least one poly(aryl ketone) is combined in a specific solvent or solvent system with other optional ingredients, such as other polymers, carbon nanotubes, colorants, dyes, polymer additives, and organic or inorganic fillers, to produce specialized films and membranes with enhanced mechanical properties (rigidity, durability, strength, etc.), flame retardancy, and/or electrical properties, for example. These specialized film and membranes are especially suitable in engineering applications, such as aerospace, aircraft, electronics, building and construction, separation membranes, photovoltaic, and the like. An advantage of the present invention is that components/additives that are not capable of withstanding the conditions of melt processing needed for poly(aryl ketones) (such as temperatures) can be incorporated into a solvent cast process of the present invention which may be done for example at below the boiling point of the solvent or at ambient conditions.

According to an embodiment of the present invention, a method of manufacturing a film or membrane includes: (a) dissolving at least one polymer comprising a poly(aryl ketone) in at least one solvent to form a dope; (b) depositing the dope on a substrate to form a coated substrate; and (c) drying the coated substrate to form the film or membrane.

According to another embodiment of the present invention, the dope used to form a film, membrane, or fiber includes at least one poly(aryl ketone) polymer at least partially or fully dissolved in at least one solvent. The dope may also include additional components such as polymers, additives (e.g., core-shell impact modifiers), fillers (e.g., carbon nanotubes), and mixtures thereof.

According to another embodiment of the present invention, a method of manufacturing a film or membrane includes: (a) dissolving polyetherketoneketone (PEKK) in a suitable solvent system, including for example a solvent comprising dichloroacetic acid (DCAA) and 0 to about 70 weight percent dichloromethane (DCM) based on the total weight of the solvent to form a dope; (b) adding carbon nanotubes to the dope; (c) depositing the dope on a substrate to form a coated substrate; and (d) drying the coated substrate to form the film or membrane. Optionally, the resulting film or membrane may also undergo suitable post-treatments, for example, to develop specific properties, such as crystallinity.

The solvent system of the present invention may also be comprised of aromatic solvents such as 4-chloro-2-methyl phenol (4-Cl-o-cresol), 4-chloro-3-methyl phenol (4-Cl-m-cresol), 3-chloro phenol, 4-chloro-phenol, 4-methyl-phenol (p-cresol); In addition mixtures of these solvents can also be used as the solvent for polyetherketoneketone (PEKK).

Additionally, the solvent of the present invention may comprise mixtures of 4-chloro-phenol and 0 to about 50 weight percent 4-chloro-3-methyl phenol (4-Cl-m-cresol) based on the total weight of the solvent. These solvents can successfully be deposited on a substrate and used to produce the films and membranes as described earlier.

The solvent of the present invention also may comprise of aromatic solvent including for example mixtures of 4-chloro-phenol, 4-chloro-3-methyl phenol (4-Cl-m-cresol) and/or ortho dichlorobenzene (ODCB). The solvent of the present invention may comprise mixtures from about 5 weight percent to about 90 weight percent of 4-chloro-phenol, 0.5 to about 10 weight percent 4-chloro-3-methyl phenol (4-Cl-m-cresol) and 0 to about 90 weight percent ortho dichlorobenzene (ODCB), based on the total weight of the solvent.

DETAILED DESCRIPTION OF THE INVENTION

Aspects of the present invention include films, membranes, and fibers of poly(aryl ketones) formed from a solvent cast process, dopes to form the same, and methods of making the same.

As used herein, "films" or "membranes" are thin layers, skins, coverings, or coatings, which are well known to those of ordinary skill in the art. The films or membranes may be adhered to a substrate or completely independent therefrom. The films or membranes may be non-porous, porous, microporous, etc., depending on the application and use. The thicknesses of the films and membranes are unlimited and may be any suitable thickness. For example, the films may range from about 1 nm (0.001 μm) to 1500 μm in thickness, e.g., about 0.25 μm to about 250 μm in thickness, more particularly, for some applications, below about 60 μm in thickness.

As used herein, a "dope" is a solution containing at least one solvent and dissolved polymer(s) (and other optional ingredients). The term "dope" may be used interchangeably with solution herein. Dopes are also well recognized in fiber chemistry and used in spinning processes to produce fibers. Thus, the dopes described herein may be used to form films, membranes, or fibers. The dissolved polymer(s) may be fully dissolved or partially dissolved. In one embodiment, the polymer(s) are fully dissolved to form a homogenous mixture of the polymer(s) (e.g., the solute) dissolved in the at least one solvent. The other optional ingredients may also be fully or partially dissolved or, alternatively, may be suspended in the dope. For example, the other optional ingredients may form a suspension in the dope, where solid particles, such as carbon nanotubes, are suspended or, alternatively, may precipitate out or form different concentrations within the dope.

As used herein, each compound may be discussed interchangeably with respect to its chemical formula, chemical name, abbreviation, etc. For example, PEKK may be used interchangeably with poly(etherketoneketone). Additionally, each compound described herein, unless designated otherwise, includes homopolymers and copolymers. The term "copolymers" is meant to include polymers containing two or more different monomers and can include, for example, polymers containing two, three or four different repeating monomer units.

Unless specified otherwise, the values of the constituents or components of the compositions are expressed in weight percent or % by weight of each ingredient in the composition. All values provided herein include up to and including the endpoints given.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of."

According to an aspect of the present invention, a method of manufacturing a film or membrane includes: (a) dissolving at least one polymer comprising a poly(aryl ketone) in at least one solvent to form a dope; (b) depositing the dope on a substrate to form a coated substrate; and (c) drying the coated substrate to form the film or membrane.

At least one polymer is dissolved in at least one solvent to form a dope. The polymer may include thermoplastic polymers, including poly(aryl ketones), such as polyetherketoneketone (PEKK), polyetheretherketone (PEEK), and the like, which may be in any suitable form. For example, the polymers may be in solid form, such as pellets, flakes, powders, granules, chips, etc. The form of the polymer is unlimited. Different polymers may be added in different states, which could be determined by one of ordinary skill in the art. In one embodiment, the poly(aryl ketone) polymer is added in a solid form.

The polymer comprises or consists of at least one poly (aryl ketone). Poly(aryl ketones) are intended to encompass all homopolymers and copolymers (including e.g., terpolymers) and the like. In one embodiment, the poly(aryl ketone) is selected from the group consisting of polyetherketoneketone (PEKK), polyetheretherketone (PEEK), polyetherketone (PEK), polyetherketoneetherketoneketone (PEKEKK), and mixtures thereof.

In one embodiment, the poly(aryl ketone) comprises polyetherketoneketone (PEKK). Polyetherketoneketones suitable for use in the present invention may comprise or consist essentially of repeating units represented by the following formulas I and II:

-A-C(=O)—B—C(=O)—  I

-A-C(=O)-D-C(=O)—  II where A is a p,p'-Ph-O-Ph- group, Ph is a phenylene radical, B is p-phenylene, and D is m-phenylene. The Formula I:Formula II (T:I) isomer ratio in the polyetherketoneketone can range from 100:0 to 0:100. The isomer ratio may be easily varied as may be desired to achieve a certain set of properties, e.g., by varying the relative amounts of the different monomers used to prepare the polyetherketoneketone. Generally, a polyetherketoneketone having a relatively high Formula I:Formula II ratio will be more crystalline than a polyetherketoneketone having a lower Formula I:Formula II ratio. Thus, the T:I ratio may be adjusted so as to provide an amorphous (non-crystalline) polyetherketoneketone or a more crystalline polyetherketoneketone, as desired. In one embodiment, a polyetherketoneketone having a T:I isomer ratio of from about 50:50 to about 90:10 may be employed.

For example, the chemical structure for a polyetherketoneketone with all para-phenylene linkages [PEKK(T)] may be represented by formula III:

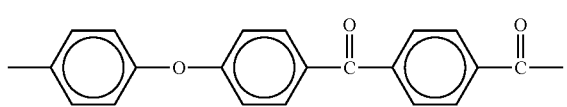

The chemical structure for a polyetherketoneketone with one meta-phenylene linkage in the backbone [PEKK(I)] may be represented by formula IV:

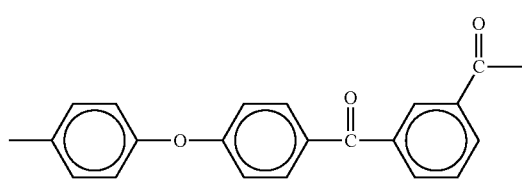

The chemical structure for a polyetherketoneketone with alternating T and I isomers, e.g., a homopolymer having 50% chemical compositions of both T and I [PEKK(T/I)] may be represented by formula V:

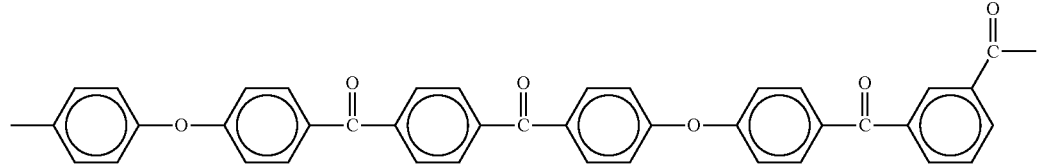

In another embodiment, the poly(aryl ketone) comprises polyetheretherketone (PEEK). Polyetheretherketones suitable for use in the present invention may comprise or consist essentially of repeating units (n≥1) represented by formula VI:

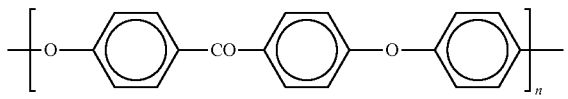

In another embodiment, the poly(aryl ketone) comprises polyetherketone (PEK). Polyetherketones suitable for use in the present invention may comprise or consist essentially of repeating units (n≥1) represented by formula VII:

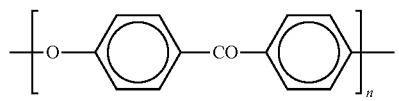

The poly(aryl ketones) may be prepared by any suitable method, which is well known in the art. For example, a poly(aryl ketone) may be formed by heating a substantially equimolar mixture of at least one bisphenol and at least one dihalobenzoid compound or at least one halophenol compound. The polymer may be amorphous or crystallized, which can be controlled through synthesis of the polymer. Thus, the polymer(s) and resulting films and membranes may run the spectrum from non-crystalline to highly crystalline depending on the intended use and industrial application for the film or membrane. Additionally, the polymer(s) may also be of any suitable molecular weight and may be functionalized or sulfonated, if desired. In one embodiment, the polymer(s) undergo sulfonation or any example of surface modification known to one skilled in the art.

The dope may include other polymers, in addition to the poly(aryl ketone). In one embodiment, the other polymers share similar melting temperatures, melt stabilities, etc. and are compatible by exhibiting complete or partial miscibility with one another. In particular, other polymers exhibiting mechanical compatibility with the poly(aryl ketone) may be added to the composition. It is also envisioned, however, that the polymers need not be compatible with the poly(aryl ketone) and may not readily dissolve in the dope (e.g., the other polymer may be a filler in suspension). The other polymers may include, for example, polyamides (such as poly(hexamethylene adipamide) or poly(ε-caproamide)); polyimides (such as polyetherimide (PEI), thermoplastic polyimide (TPI), and polybenzimidazole (PBI)); polysulfones/sulfides (such as polyphenylene sulfide (PPS), polyphenylene sulfone (PPSO$_2$), polyethersulfone (PES), and polyphenylsulfone (PPSU)); poly(aryl ethers); and polyacrylonitrile (PAN). In one embodiment, the other polymers include polyamide polymers and copolymers, polyimide polymers and copolymers, etc. Polyamide polymers may be particularly suitable in high temperature applications. The additional polymers may be blended with the poly(aryl ketone) by conventional methods.

The polymer is dissolved in at least one solvent. Conventionally, many or most poly(aryl ketones) do not dissolve in most solvents, and it was previously very difficult to make poly(aryl ketones) into solutions or dopes. In the present invention, certain solvents or solvent systems were discovered to be particularly effective and suitable for dissolving poly(aryl ketone) polymers to form dopes, and more specifically, were found to be particularly useful for forming specialized films, membranes, and fibers having improved properties for certain applications.

The solvent may be selected from any suitable solvents or solvent systems that effectively dissolve the polymer (e.g., the poly(arylketone)). In one embodiment, the solvent(s) and polymer(s) are selected such that there is no or minimal reaction between them. For example, useful solvents may include organic compounds containing one or more polar functional groups, such as for example a ketone, sulfone, hydroxyl, ester, halo or amino group, including solvents having a boiling point from about 175° C. to about 380° C. (e.g., organic compounds having an aromatic or polynuclear aromatic component). Suitable solvents may include, but are not limited to, benzophenone, α-chloronaphthalene, diphenylsulfone, 2-phenylphenol, p-methoxyphenol, 2-methoxynaphthalene, ethyl-4-hydroxybenzoate, N-cyclohexyl-2-pyrrolidone, pentafluorophenol, dimethylphthalate, or phenyl benzoate or mixtures thereof.

In one embodiment of the present invention, the at least one solvent comprises a halogenated organic compound (HOC) such as an organic acid containing chlorine, bromine, iodine, or fluorine. More particularly, the at least one solvent comprises a halogenated organic acid (such as carboxylic acids (e.g., acetic acids) and organic sulfonic acids) containing chlorine, bromine, iodine, and/or fluorine. In one embodiment, the solvent includes a halogenated organic acid, such as monochloroacetic acid, dichloroacetic acid, trichloroacetic acid, tetrachlorophthalic acid, trifluoroacetic acid, for example or mixtures thereof. The halogenated organic acid may optionally be combined with other organic solvents, such as dichloromethane, toluene, dichloroethane, or ethyl acetate, or mixtures thereof, for example. In other embodiments, the halogenated organic acid is a chlorinated organic acid and may for example be optionally combined with other organic solvents, such as dichloromethane, toluene, dichloroethane, trifluoroacetic acid or ethyl acetate or mixtures thereof. In particular, certain effective solvents were found to have a boiling point at atmospheric pressure of not greater than 250° C.

In one embodiment, the at least one solvent comprises a halogenated organic acid. More particularly, the solvent may comprise a halogenated organic acid having a pKa of from about 1 to about 3. Additionally, the acids useful for effectively dissolving the polymer may be found to exhibit lower pKas than standard organic acids and/or higher dielectric constants, which may also attribute to the solvents' effectiveness at dissolving the selected polymers.

In one embodiment, the solvent comprises at least one of dichloroacetic acid (DCAA) and dichloromethane (DCM). Thus, the solvent may include a mixture of solvents, such as a mixture of dichloroacetic acid (DCAA) and dichloromethane (DCM). In one embodiment, the solvent includes from about 30 weight percent to about 100 weight percent dichloroacetic acid (DCAA) and 0 to about 70 weight percent dichloromethane (DCM) based on the total weight of the solvent.

In one embodiment, the solvent comprises at least one aromatic solvent such as 4-chloro-2-methyl phenol (4-Cl-o-cresol), 4-chloro-3-methyl phenol (4-Cl-m-cresol), 3-chloro phenol, 4-chloro-phenol, 4-methyl-phenol (p-cresol). Thus, the solvent may include a mixture of these solvents, such as a mixture of 4-chloro-phenol and 4-chloro-3-methyl phenol (4-Cl-m-cresol). In one embodiment, the solvent includes from about 50 weight percent to about 100 weight percent of 4-chloro-phenol and 0 to about 50 weight percent 4-chloro-3-methyl phenol (4-Cl-m-cresol) based on the total weight of the solvent.

In one embodiment, the solvent comprises a mixture of aromatic solvents such as 4-chloro-2-methyl phenol (4-Cl-o-cresol), 4-chloro-3-methyl phenol (4-Cl-m-cresol), 3-chloro phenol, 4-chloro-phenol, 4-methyl-phenol (p-cresol) and ortho dichlorobenzene (ODCB). Thus, the solvent may include a mixture of these solvents, such as a mixture of 4-chloro-phenol 4-chloro-3-methyl phenol (4-Cl-m-cresol) and ortho dichlorobenzene (ODCB). In one embodiment, the solvent includes from about 5 weight percent to about 90 weight percent of 4-chloro-phenol, 0.5 to about 10 weight percent 4-chloro-3-methyl phenol (4-Cl-m-cresol) and 0 to about 90 weight percent ortho dichlorobenzene (ODCB), based on the total weight of the solvent.

The dope may also include additional component(s) such as additional polymers; additives, such as core-shell impact modifiers; fillers or reinforcing agents, such as glass fibers; carbon fibers; plasticizers; pigments or dyes; thermal stabilizers; ultraviolet light stabilizers or absorbers; antioxidants; processing aids or lubricants; flame retardant synergists, such as $Sb_2O_3$, zinc borate, and the like; or mixtures thereof. These components may optionally be present, for example, in an amount of about 0.1 weight percent to about 70 weight percent based on the total weight of the dope composition. As previously discussed, the dope may include additional polymers. The additional polymers may be dissolved within the dope or may be selected to be solid particles which do not dissolve in the dope.

The dope may also include additives, such as core-shell impact modifiers. These additives may optionally be present in an amount of from about 2 weight percent to about 40 weight percent, based on the total weight of the dope composition. The core-shell impact modifiers may include multi-layer polymers and block copolymers having at least one hard and at least one soft block (e.g., a soft rubber or elastomeric core and a hard shell or a hard core covered with a soft elastomeric layer and a hard shell). For example, the soft blocks or rubber layers may be composed of low glass transition (Tg) polymers, such as polymers of butyl acrylate (BA), ethylhexyl acrylate (EHA), butadiene (BD), BD/styrene, butylacrylate/styrene, etc. or combinations thereof. The hard blocks or layers may be composed of any suitable polymers, such as polymers of methyl methacrylate (MMA), ethyl acrylate (EA), allyl methacrylate, styrene or combinations thereof, for example. The core-shell impact modifiers may be of any suitable size and shape. For example, the particles may have a particle size ranging from about 2 nm to about 700 nm.

Suitable fillers may include fibers, powders, flakes, etc. For example, fillers may include at least one of carbon nanotubes, carbon fibers, glass fibers, polyamide fibers, hydroxyapatite, aluminum oxides, titanium oxides, aluminum nitride, silica, alumina, barium sulfates, etc. The size and shape of the fillers are also not particularly limited. Such fillers may be optionally present in an amount of from about 10 weight percent to about 70 weight percent.

In one embodiment, the dope comprises carbon nanotubes (CNT). Carbon nanotubes are allotropes of carbon with a cylindrical nanostructure. The nanotubes may be single-walled or multi-walled; functionalized; coated; or modified in any suitable way. Also, the nanotubes may have any suitable length-to-diameter ratio as needed for the desired properties of the resulting films and membranes. The dope composition may include any suitable amount of carbon nanotubes as preferred for the application. For example, the dope may include from trace amounts up to about 45 weight percent carbon nanotubes, e.g., from about 0.5 weight percent to about 20 weight percent carbon nanotubes. Masterbatches of dope may contain from about 20 weight percent to about 30 weight percent carbon nanotubes, for example. By including a filler, such as carbon nanotubes, the electrical conductivity of the resulting film or membrane may be controlled or selected depending on the desired end use. Thus, it is possible to form a film or membrane from the dope described herein having certain electrical properties, in addition to enhanced mechanical properties, for electronics or photovoltaic applications, for example.

In another embodiment, the dope used to form the film or membrane includes a poly(aryl ketone) polymer, e.g., PEKK, which is at least partially or fully dissolved in the solvent (such as a halogenated organic acid). In an embodiment, the dope also includes carbon nanotubes.

The dope, with or without additional component(s), may be prepared by any conventional mixing or agitation methods. For example, a suitable method comprises mixing a solid poly(aryl ketone) polymer with the solvent(s) at or above room temperature until the polymer is dissolved and the dope is formed, and optionally, adding and mixing a filler, such as carbon nanotubes, with the dope. The additional component(s) may be added to the dope at any suitable time. For example, the additional component(s) may be added when the polymer is added to the solvent. Alternatively, the additional component(s) may be added before or after the dope has been formed.

In one embodiment, the polymer is dissolved at or above ambient/room temperature (e.g., about 20° C. to about 27° C. or about 25° C. at standard conditions). It is not necessary to heat the polymer/solvent mixture to vaporize the solvent(s). The concentration of polymer(s) and other additional components should be selected to provide for a suitable viscosity of the solution to form the dope. For example, the polymer(s) may be present in the dope composition in amounts ranging from about 0.1 weight percent to about 50 weight percent. A person of ordinary skill in the art would be able to select or maintain the appropriate viscosity to process the solution.

In another embodiment, when the solvent comprises at least one aromatic solvent such as 4-chloro-2-methyl phenol (4-Cl-o-cresol), 4-chloro-3-methyl phenol (4-Cl-m-cresol), 3-chloro phenol, 4-chloro-phenol, 4-methyl-phenol (p-cresol), the polymer is dissolved at ambient/room temperature (e.g., about 20° C. to about 27° C. or about 25° C. at standard conditions) and elevated temperatures (e.g., about 75° C. to about 85° C., or higher temperatures about 145° C. to about 155° C.). The concentration of polymer(s) and other additional components should be selected to provide for a suitable viscosity of the solution to form the dope. For example, the polymer(s) may be present in the dope composition in amounts ranging from about 0.1 weight percent to about 50 weight percent.

In another embodiment, when the solvent comprises of mixtures of aromatic solvents such as 4-chloro-2-methyl phenol (4-Cl-o-cresol), 4-chloro-3-methyl phenol (4-Cl-m-cresol), 3-chloro phenol, 4-chloro-phenol, 4-methyl-phenol (p-cresol), the polymer is dissolved at ambient/room temperature (e.g., about 20° C. to about 27° C. or about 25° C. at standard conditions) and elevated temperatures (e.g., about 75° C. to about 85° C., or higher temperatures about 145° C. to about 155° C.). In this embodiment the solvent may be comprised of a mixture of 4-chloro-phenol and 4-chloro-3-methyl phenol (4-Cl-m-cresol), including from about 50 weight percent to about 100 weight percent of 4-chloro-phenol and 0 to about 50 weight percent 4-chloro-3-methyl phenol (4-Cl-m-cresol) based on the total weight of the solvent. The concentration of polymer(s) and other additional components should be selected to provide for a suitable viscosity of the solution to form the dope. For example, the polymer(s) may be present in the dope composition in amounts ranging from about 0.1 weight percent to about 50 weight percent.

In another embodiment, when the solvent comprises a mixture of aromatic solvents such as 4-chloro-2-methyl phenol (4-Cl-o-cresol), 4-chloro-3-methyl phenol (4-Cl-m-cresol), 3-chloro phenol, 4-chloro-phenol, 4-methyl-phenol (p-cresol) and ortho dichlorobenzene (ODCB), the polymer is dissolved at ambient/room temperature (e.g., about 20° C. to about 27° C. or about 25° C. at standard conditions) and elevated temperatures (e.g., about 75° C. to about 85° C., or higher temperatures about 145° C. to about 155° C.). In this embodiment the solvent may be comprised of a mixture of of 4-chloro-phenol, 4-chloro-3-methyl phenol (4-Cl-m-cresol) and ortho dichlorobenzene (ODCB), including from about 5 weight percent to about 90 weight percent of 4-chloro-phenol, 0.5 to about 10 weight percent 4-chloro-3-methyl phenol (4-Cl-m-cresol) and 0 to about 90 weight percent ortho dichlorobenzene (ODCB), based on the total weight of the solvent. The concentration of polymer(s) and other additional components should be selected to provide for a suitable viscosity of the solution to form the dope. For example, the polymer(s) may be present in the dope composition in amounts ranging from about 0.1 weight percent to about 50 weight percent.

A person of ordinary skill in the art would be able to select or maintain the appropriate viscosity to process the solution.

The dope is deposited on or applied to a substrate to form a coated substrate. The coating may be applied substantially uniformly over the entire substrate or a portion thereof. The coating may be applied using any suitable equipment and techniques known in the art. For example, the solvent cast process may be employed where the dope is cast onto the substrate using a coating roller, spray nozzle, flow coating, by dipping, electrostatic application, mechanical application, etc.

As used herein, "substrate" refers to any surface to which the dope of the present invention is applied. Any suitable substrate may be selected depending on the desired application, such as films, foils, etc. Suitable substrates may include, but are not limited to, glass, polymer films, metal sheets (e.g., aluminum, titanium, and stainless steel), silicon wafers, paper, plastics, wood, stone, etc. Plastic substrates may include, for example, polyacrylonitrile-butadiene-styrene, polyacrylonitrile-styrene-acrylic, polycarbonate/polyacrylonitrile-butadiene-styrene, high impact polystyrene, polyvinyl chloride, thermoplastic olefins, polyolefins, polystyrene, polystyrene-acrylonitrile, polycarbonate, polyethylene terephthalate, and glycolised polyester. The substrate could be a single layer, or could itself contain multiple layers (e.g., multilayer or laminate). The substrate may also be a smooth or rough surface.

The dope may form a protective film or barrier on the substrate, and it may be desirable for there to be some adherence between the film and the substrate (e.g., glass, silicon wafer, etc.). A suitable adhesive or coupling agent may also be used to adhere the dope to the substrate. Alternatively, the coating may be subsequently removed from the substrate. In that case, some degree of release (or minimal adherence) of the film or membrane from the substrate (e.g., KEVLAR™, TEFLON®, aluminum, coated paper, etc.) may be desirable. In one embodiment, the film or membrane is not released or removed from the substrate until the film/membrane is formed and/or cured.

The coated substrate is dried to form the film or membrane. The coated substrate may be dried using any suitable equipment or techniques known in the art including single and multi-stage drying processes. For example, the coated substrate is dried at or above room temperature (e.g., about 20° C. to about 27° C. or about 25° C. at standard conditions). In one embodiment, the coated substrate is dried at a temperature below the boiling point of the highest boiling point solvent in the dope. The drying conditions may provide for a film or membrane that is non-porous, porous, macroporous, etc. In one embodiment, the film or membrane is non-porous. Moreover, depending on the processing conditions and application, it may be desirable to wash out the higher boiling solvent(s) with lower boiling solvent(s) in order to provide for easier drying/processing conditions.

The film or membrane may be formed to any suitable thickness depending on the desired application. If a thicker film or membrane is required, the concentration of polymers may be increased. Additionally, at least one additional coating of dope may be applied on the substrate until the desired thickness is achieved (i.e., the film or membrane may be comprised of a single layer or multiple layers (e.g., multilayer or laminate). The additional coatings may be the same or different dope compositions, e.g., containing different polymer(s) and/or solvent systems. The additional coating(s) may be applied at any suitable time, e.g., after the initial coating has at least partially or fully dried. For example, the total thickness of the film or membrane may range from about 1 nm to about 1500 μm.

Optionally, the resulting film or membrane may also undergo suitable post-treatments known to one skilled in the art. For example, post-treatments, such as heating, stretching, or solvent extraction, may be used to develop specific properties in the film, membrane, or fiber, such as the polymer morphology or degree of crystallinity.

For applications where a substrate is not required, once the coatings) have dried, completely or at least partially, the substrate may be removed from the film or membrane. The substrate or film or membrane may be fully or partially removed using any suitable equipment and techniques known in the art. For example, the substrate may be heated to remove the film or the film or membrane may be mechanically separated from the substrate. Additionally or alternatively, the substrate may be submerged into a suitable liquid known to one skilled in the art to remove the film or membrane.

It is also envisioned that a scrim or reinforcing structure may be applied to the film or membrane during formation or after it has been formed to impart additional strength, rigidity, etc. For example, a scrim member may be sandwiched between two layers of dope or the dope could flow around and into the scrim to form a reinforced-film or membrane. Suitable scrim or netting members are well known in the art and may include plastics, such as acrylic or polypropylene, or non-wovens, such as glass fabric or polyester fabrics, etc.

In one embodiment, a method of manufacturing a film or membrane includes dissolving polyetherketoneketone (PEKK) in a solvent comprising dichloroacetic acid (DCAA) and 0 to about 70 weight percent dichloromethane (DCM) based on the total weight of the solvent to form a dope; adding carbon nanotubes to the dope; depositing the dope on a substrate to form a coated substrate; and drying the coated substrate to form the film or membrane.

The specialized films and membranes described herein may be used for any suitable purpose. For example, potential applications include, but are not limited to, aerospace, aircraft, electronics, building and construction, separation membranes, photovoltaic, etc. The particular use of the films or membranes is not especially limited.

The specialized films and membranes described herein have been found to provide improved properties. In particular, the films and membranes have good mechanical properties including toughness, rigidity, durability, and strength. The films and membranes also exhibit good flame retardancy (e.g., as defined by the UL ratings). Additionally, the films and membranes may be formed to have given electrical properties (such as conductivity), if desired.

The dope described herein may also be used to form fibers. Any suitable techniques or methods known to one of ordinary skill in the art may be used to produce fibers, such as spinning processes. For example, the fibers may be extruded using a ram extrusion process, which forces the dope through a spinnerette into a coagulation bath. Electrospinning methods may also be employed.

While certain embodiments of the invention have been shown and described herein, it will be understood that such embodiments are provided by way of example only without departing from the spirit of the invention. Accordingly, it is intended that the appended claims cover all such variations as fall within the spirit and scope of the invention. Numerous variations, changes and substitutions will occur to those skilled in the art.

EXAMPLES

Example 1—PEKK Films from DCM/DCAA Solvent Mixtures 500 mg of polyetherketoneketone (PEKK SP) flakes were placed in a flask. 5 ml of dichloromethane (DCM) and 2 ml of dichloroacetic acid (DCAA) were added to obtain a 30/70 volume percent (v/v %) DCAA/DCM solution. Considering a density of 1.32 g/ml for DCM and 1.563 g/ml for DCAA, the solid concentration of the system was about 5%. At ambient conditions, complete dissolution of the PEKK flakes was observed and dissolution of the PEKK polymer was immediate. The resulting solution was then poured on a glass slide and dried at room temperature overnight. After this process a PEKK film was obtained. Additional drying can also be employed along with mild heating (50° C.) to facilitate removal of residual solvent (DCAA).

Example 2—PEKK/MWCNT Composite Films from DCM/DCAA Solvent Mixtures 500 mg of polyetherketoneketone (PEKK SP) flakes were placed in a flask. 0.5 ml of MWCNT aqueous solution were added along with 4.5 ml of dichloromethane (DCM) and 2 ml of dichloroacetic acid (DCAA). Similar to Example 1, at ambient conditions, complete dissolution of the PEKK flakes was observed and dissolution of the PEKK polymer was immediate. The resulting solution was then poured on a glass slide and dried at room temperature overnight, Mild heating (50° C.) was employed to evaporate residual solvent (DCAA) and recover the resulting PEKK film.

Example 3—PEKK Films from 4-chloro-phenol/4-chloro-3-methyl phenol (4-Cl-m-cresol) Mixtures 30 to 40 g of a solvent mixture containing 90 weight percent of 4-chloro-phenol and 10 weight percent of 4-chloro-3-methyl phenol (4-Cl-m-cresol) were heated gradually to 130° C. To this solution polyetherketoneketone (PEKK) flakes (Obtained from Arkema lot P1011004) were added gradually until saturation is obtained at a given temperature. As expected, the total amount of PEKK capable of being dissolved increases at higher temperatures. The resulting saturated solution at approximately 125° C. contained approximately 11.2 weight percent of PEKK. The resulting solution is gradually cooled down and then poured on a glass substrate at temperatures ranging between 50-60° C. The glass substrate was then placed on an ethanol/water bath (50/50) solution to facilitate the release of the PEKK film. After release from the glass substrate the resulting film is subsequently washed in a fresh ethanol/water (50/50) solution and is left aside for drying at ambient conditions. The resulting film displayed a white color with thicknesses that range between 50-100 microns.

Example 4—Solubility Experiments of PEKK in Aromatic Solvents

To understand the potential use of commercially available aromatic solvents for the preparation of PEKK films and membranes, the solubility of PEKK in various solvents was measured. In all cases the procedure included adding 20 g of the desired solvent to a 100 ml Erlenmeyer flask. The flask was then gradually heated to the desired temperature (70° C. or 150° C.) and to this system a solution of 30% polyetherketoneketone (PEKK CE from Arkema lot P1101003) was gradually added until a saturated solution was obtained at the desired temperature. The solubility in weight percent from each aromatic solvent tested, along with the properties of the solution at room temperature is presented in the table below.

| Solvent | Solubility at 70° C. (weight %) | Solubility at 150° C. (weight %) | Physical State of solution at room temperature |
|---|---|---|---|
| 4-chloro-2-methyl phenol (4-Cl-o-cresol) | 4 | 5 | solid |
| 4-chloro-3-methyl phenol (4-Cl-m-cresol) | 4 | 6 | solid |
| 3-chloro-phenol | 4 | 6 | solid |
| 4-chloro-phenol | — | 1.5 | solid |
| 4-methyl-phenol (p-cresol) | — | 1.5 | liquid |

Example 5—Solubility Experiments of PEKK in Aromatic Solvents Mixtures

Similar to Example 4, in order to understand the potential use of mixtures of commercially available aromatic solvents for the preparation of PEKK films and membranes, the solubility of PEKK in various solvents mixtures was measured. As Example 4, the procedure included adding 20 g of the desired solvent to a 100 ml Erlenmeyer flask. The flask was then gradually heated to the desired temperature (80° C. or 150° C.) and to this system a solution of 30% polyetherketoneketone (PEKK CE from Arkema lot AOR 1889.511) was gradually added until a saturated solution was obtained at the desired temperature. The solubility in weight percent from each aromatic solvent mixture tested, along with the properties of the solution at room temperature is presented in the table below.

| Solvent Mixture | Weight Percent of 4-chloro-3-methyl phenol (%) | Solubility at 80° C. (weight %) | Solubility at 150° C. (weight %) | Physical State of solution at room temperature |
|---|---|---|---|---|
| 4-chloro-3-methyl phenol/4-ethyl-phenol | 50 | 1 | 2 | liquid |
| 4-chloro-3-methyl phenol/4-ethyl-phenol | 30 | 1 | 2 | liquid |
| 4-chloro-3-methyl phenol/4-methoxy-phenol | 50 | 1 | 2.5 | liquid |
| 4-chloro-3-methyl phenol/3-chloro-phenol | 50 | 2.5 | 6 | solid |
| 4-chloro-3-methyl phenol/3-chloro-phenol | 30 | 2.5 | 6 | solid |
| 4-chloro-3-methyl phenol/4-chloro-phenol | 30 | 1.5 | 6 | liquid |

What is claimed:

1. A method of manufacturing a coated substrate, comprising:
dissolving at least one polymer comprising polyetherketoneketones (PEKK) in at east one solvent to form a dope;
wherein the at least one solvent comprises at least one of 4-chloro-2-methyl phenol (4-Cl-o-cresol), 4-chloro-3-methyl phenol (4-Cl-m-cresol), 3-chloro phenol, 4-chloro-phenol, or 4-methyl-phenol (p-cresol),
depositing the dope on a substrate to form a coated substrate; and
drying the coated substrate to form the coated substrate such that the coating is non-porous and adheres to the substrate,
wherein the substrate is selected from the group consisting of glass, polymer films, metal sheets, silicon wafers, paper, plastics, wood, stone, and non-wovens.

2. A method of manufacturing a coated substrate according to claim 1, wherein the at least one solvent comprises a mixture of 4-chloro-phenol and 4-chloro-3-methyl phenol (4-Cl-m-cresol).

3. A method of manufacturing a coated substrate according to claim 1, wherein the at least one solvent comprises a mixture of 4-chloro-phenol, 4-chloro-3-methyl phenol (4-Cl-m-cresol) and ortho dichlorobenzene (ODCB).

4. A method of manufacturing a coated substrate according to claim 1, wherein the substrate is glass.

5. A method of manufacturing a coated substrate according to claim 1, wherein the substrate is plastic.

6. A method of manufacturing a coated substrate according to claim 1, wherein the substrate is metal.

7. A method of manufacturing a coated substrate according to claim 1, comprising:
dissolving polyetherketoneketone (PEKK) in a solvent comprising a mixture of 4-chloro-phenol and 4-chloro-3-methyl phenol 4-Cl-m-cresol), including from about 50 weight percent to less than 100 weight percent of 4-chloro-phenol and up to about 50 weight percent 4-chloro-3-methyl phenol (4-Cl-m-cresol) based on the total weight of solvent to form a dope;
depositing the dope on metal substrate to form a coated substrate; and
drying the coated metal substrate to form a coated metal substrate wherein the coating is non-porous and adhered to the metal substrate.

8. The method of claim 1 further comprising a step of post-treating the coated substrate to develop crystallinity.

9. The method of claim 1 wherein the at least one polymer consists of PEKK.

10. The method of claim 1 wherein the dope further comprises at least one additional component selected from the group consisting of additional polymers, additives, fillers, core-shell impact modifiers, carbon nanotubes, glass fibers, carbon fibers, plasticizers, pigments, dyes, thermal stabilizers, ultraviolet light stabilizers, antioxidants, processing aids, lubricants, flame retardants, and mixtures thereof.

* * * * *